United States Patent [19]
Julnes

[11] Patent Number: 5,385,770
[45] Date of Patent: Jan. 31, 1995

[54] METHODS FOR PRODUCING DETECTIBLE WARNINGS ON SURFACES AND PRODUCTS THEREOF

[76] Inventor: Jon N. Julnes, P.O. Box 1870, Woodinville, Wash. 98072

[21] Appl. No.: 243,952
[22] Filed: May 17, 1994
[51] Int. Cl.$^6$ ............................................. B32B 3/00
[52] U.S. Cl. ................................. 428/195; 427/137; 427/272; 427/282; 428/206; 428/210; 428/325
[58] Field of Search ................ 427/282, 272, 137; 428/195, 206, 210, 325

[56] References Cited

U.S. PATENT DOCUMENTS

| | | | |
|---|---|---|---|
| 1,947,271 | 2/1934 | Mattison | 427/272 |
| 4,758,469 | 7/1988 | Lange | 427/137 X |
| 4,988,555 | 1/1991 | Hedblom | 427/137 X |
| 5,203,881 | 4/1993 | Wiand | 51/293 |

OTHER PUBLICATIONS

Product Bulletin, *Two-Component Highway Marking System: Dura-Stripe ©*, Morton Int'l (Feb. 16, 1993).
Product Brochure, *Dura-Stripe © Road Marking System*, Morton Int'l (1992).
Photographs of "Pathfinder" tile manufactured by the Carsonite Company, Carson City, Nev., no date.

*Primary Examiner*—Michael Lusignan
*Attorney, Agent, or Firm*—Stephen M. Evans; David L. Garrison

[57] ABSTRACT

The present invention is characterized as methods for fixedly depositing solidified protrusions on to a surface, and products thereof so as to create a detectible warning whereby the tactile and visual characteristics of the detectible warnings contrast with the tactile and visual characteristics of surrounding surfaces. To create such a detectible warning, a mask in the form of a resilient mat perforated with a plurality of apertures so as to form a repeating pattern. Each aperture acts as a mold of a protrusion having predetermined dimensions. To enhance the functionality of the protrusions, each protrusion has a generally inclined peripheral surface and rounded peripheral surface to substrate and peripheral surface to upper surface interfaces. The mat is placed in contact with the substrate on which a detectible warning is desired. A blend is created from a curable viscous substance and one or more of the following: reinforcing elements, reflective elements, pigments, or abrasives. The blend is then worked into the apertures whereupon it begins to solidify. After the blend becomes semi-stable, the mat is removed and the protrusions are allowed to fully cure.

19 Claims, 2 Drawing Sheets

METHODS FOR PRODUCING DETECTIBLE WARNINGS ON SURFACES AND PRODUCTS THEREOF

FIELD OF THE INVENTION

The present invention relates to the field of surface treatment and more specifically to the field of modifying a traveled surface to have detectible warnings or raised protrusions thereon.

BACKGROUND OF THE INVENTION

With increasing public awareness regarding persons with disabilities, many local and regional laws, regulations, and ordinances have been passed that require modifications to existing structures and consideration of the disabled when undertaking new construction. Perhaps the most significant new legislation has been the enactment of the Americans with Disabilities Act (ADA). This Act sets forth numerous requirements regarding access to and use of facilities by the disabled.

One of the more widely recognized disabilities is impaired vision. While previously the incorporation of tactile indicia and detectible warnings was discretionary, under the ADA suitable tactile indicia and detectible warnings must be provided in many situations. Moreover, the types of acceptable detectible warnings are now regulated.

Specifically, the ADA now requires detectible warnings on the walking surface of curb ramps or on a walking surface prior to it crossing or adjoining a vehicular way not otherwise separated by curbs, railings, or other such elements. Similarly, if there are no curbs, railings, or the like between a walking surface and perhaps a reflecting pool, detectible warnings must be used.

Detectible warnings have been defined as "a standardized integral surface feature built in or applied to walking surfaces or other elements to warn individuals with visual impairments of hazards on a circulation path." The technical specifications of the ADA require that detectible warnings on walking surfaces have a specific truncated dome pattern. Although the standardization requirement has been reserved, this unique pattern is intended to provide a consistent and uniform surface that is distinctive from other materials and, therefore, recognizable as a warning to pedestrians that they are approaching a potentially dangerous area. The detectible warnings must contrast visually with adjoining surfaces, and material used to provide contrast must be an integral part of the walking surface. Though not required, a 70% contrast ratio is recommended. Detectible warnings used on interior surfaces shall differ from adjoining walking surfaces in resiliency or sound-on-cane contact.

When discussing detectible warnings for pedestrians, three traditional techniques of achieving such warnings have been used: surface forming, etching, and deposition. In surface forming, a desired pattern is created in the surface during its formation stage. For example, when a concrete walk is being formed, the detectible warning pattern is created therein usually by stamping the surface or by applying a prefabricated surface treatment. Etching, if done during the formation of the surface, provides a low cost method for treating a traveled surface to have the required detectible warning. However, if etching is desired on an existing surface, a material removal process must usually be used which often incorporates the use of abrasives or the like. With both of these means, however, there is little ability to incorporate visual contrast or other required or desirable aspects identified in the ADA.

Deposition techniques are usually carried out after the surface formation process has been completed. Thus, such techniques are suitable for both new and old work. A significant problem associated with many other deposition techniques is that the resulting detectible warnings may be abrupt so as to engender the tripping of a person using that surface. In addition, many surfaces having detectible warnings are slippery and/or lack contrast when compared to the base surface. Moreover, it is desirable to have detectible warnings that are uniform in appearance—a quality that some deposition techniques fail to provide.

SUMMARY OF THE INVENTION

The present invention is characterized as methods for producing detectible warnings in the form of protrusions on surfaces and products thereof. In general form, a mask of substantially planar material is perforated with a plurality of apertures, the apertures being sized and arranged in a pattern so as to enhance tactile detectibility of the surface to be treated. The thickness of the mask will generally determine the relative elevation of the protrusions on the surface after completion of the formation process. The mask may be rigid or flexible depending largely upon design considerations.

A viscous substance curable to a solid is combined with at least one adjunct to form a blend that will enhance the longevity and/or detectibility of the soon to be formed protrusions. At least one adjunct comprises glass fibers, spheres, or filaments to enhance durability of the protrusions; pigments or reflective matter to enhance the visual distinction of the protrusions when compared to the surface; abrasive to enhance the tactile distinction between the protrusions and the surface and increase friction between the protrusions and an object encountering the protrusions. Depending upon the surface and the surrounding environment, one or more of the foregoing adjuncts may be used.

The mask is located on the exposed surface of the substrate and the blend is then deposited into the apertures of the mask and preferably worked therein to ensure adequate dispersion and bonding to the substrate surface. Any excess material may be screeded from the upper surface of the mask and removed.

After the blend has begun to cure or solidify, the mask is removed from the surface leaving behind partially solidified detectible warnings or protrusions. In preferred form, the protrusions are characterized as rectangular solids with at least two rounded sides and having upwardly inclined peripheral surface that merges with the substrate and the upper surface of the protrusion with curved transition areas.

In a preferred embodiment, an optimal pattern for a detectible warning surface uses a series of staggered elliptical protrusions that are elongated along their major axes so as to create elongated ellipses having substantially parallel sides. By creating such a pattern, a minimal likelihood of cane or other sensing object missing a protrusion is created while at the same time a minimal amount of material is used to form the protrusions. Beneficially, because the pattern is segmented, surface water can easily be transported away from the surface.

While the choice of protrusion material may be varied, particular success has been achieved by using a methacrylate polymer doped with suitable binders such as glass fibers for strength, refractory material such as glass spheres or beads for improved visual contrast and low light identification, and pigment for color contrast. It has been found that such a mixture provides exceptional bonding properties and longevity.

The present invention is not limited to ADA mandated applications but is applicable to any surface treatment process wherein surface protrusions are desired. Additional applications of the present invention include surface traction enhancers, surface water runoff directors, and high visibility applications.

DETAILED DESCRIPTION OF THE INVENTION

Figure 1:
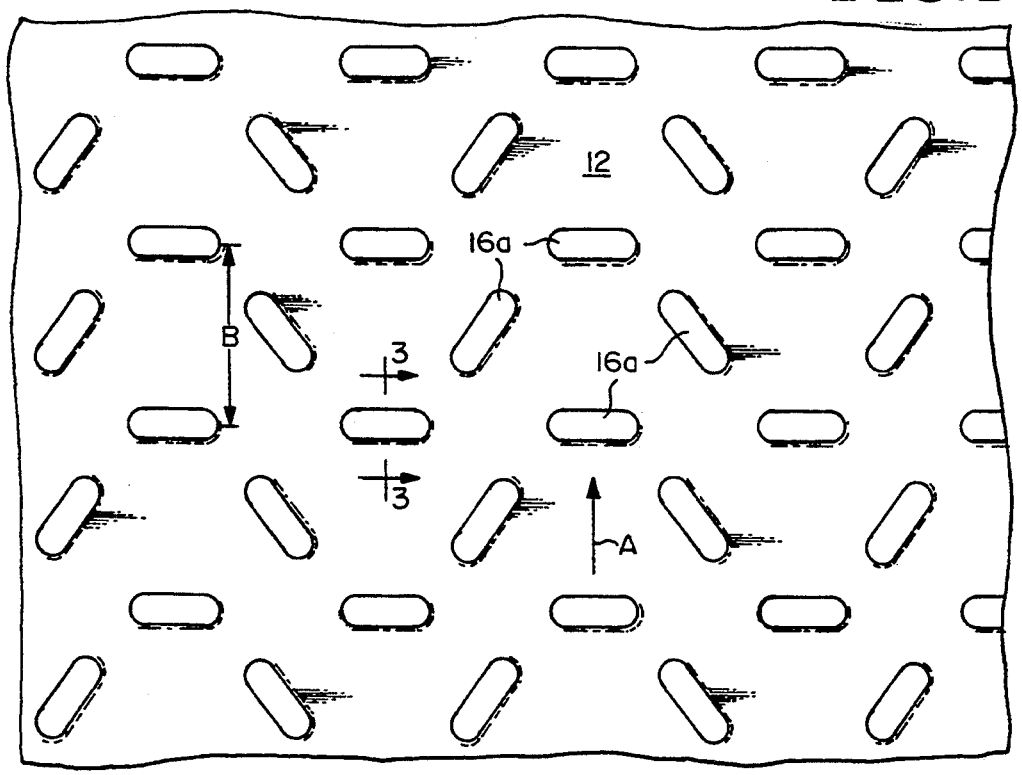
FIG. 1 is a plan view of a surface having a plurality of detectible warnings arranged in a pattern thereon.
Figure 2:
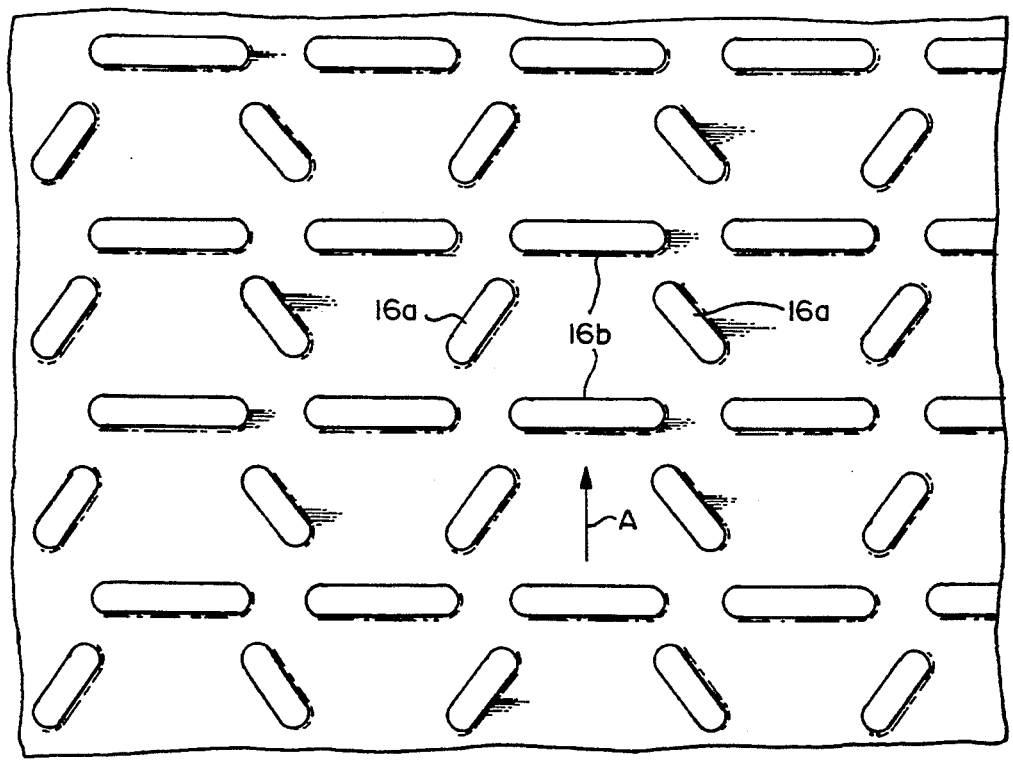
FIG. 2 is a plan view similar to FIG. 1 but wherein adjacent rows of detectible warnings are elongated.

Referring now to the several drawings wherein like numerals indicate like parts and first to FIG. 1, a plan view of a surface 12 having a pattern of detectible warnings or protrusions 16a formed thereon is shown. The illustrated pattern, generally referred to as multiple sinusoidal patters in stacked relationship, is chosen so as to provide the greatest likelihood that an object, in constant contact with surface 12, will encounter a protrusion 16a in the least distance. The preferred orientation of the pattern is shown by arrow A which represents the direction of pedestrian travel. FIG. 2 is similar to FIG. 1 except that the horizontally oriented rows of protrusion 16a have been replaced with elongated protrusion 16b. A benefit of such replacement is that it provides a significant improvement in guidance for visually impaired persons using canes.

Figure 3:
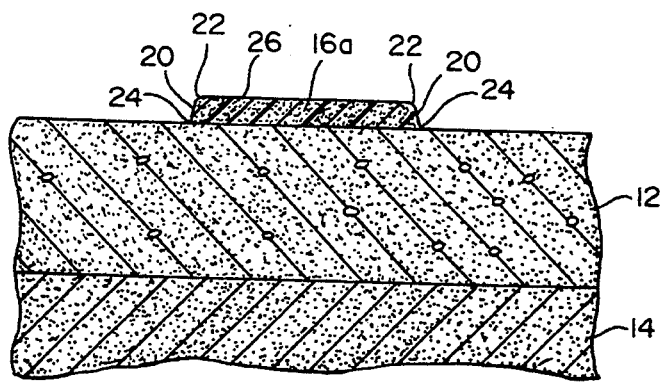
FIG. 3 is a cross sectional view taken substantially along the line 3—3 in FIG. 1 emphasizing the sloped and rounded edge nature of a single protrusion.

A cross section of protrusion 16a bonded to substrate 12 is shown in FIG. 3. Inclined peripheral surfaces 20 have curved transitions 22 and 24 with upper surface 24 and substrate 12 respectively so that an object such as a cane, shoe, or foot, as well as an implement such as a shovel or squeegee will not jamb or lodge in the otherwise sharp corners or edges created at these interfaces. Beneficially, these curved transitions 22 and 24 increase the protrusion's resistance to dislodgment from lateral impacts by permitting a certain degree of impact redirection.

The detectible warnings of the present invention preferably comprise a methacrylate polymer blended with binders, pigments, and abrasive. A readily available commercial form of a blend is available under the trademark Dura-Stripe ® from the Traffic Markings division of Morton International (Salem, Oreg.). This product has superior abrasion resistance, chemical resistance, and longevity. In preferred form, the composition of the detectible warnings is a methacrylate polymer blend having glass fiber binders, pigments, and reflective material. The use of a methacrylate polymer engenders strong bond characteristics with normally encountered substrate surfaces such as asphalt (excluding asphalt compositions based on coal tar or its distillates), concrete, and wood. The use of glass fibers enhances structural properties of the detectible warnings and reduces the amount of resin mixture needed for any given application. The percentage pigment chosen provides adequate color contrast under the provisions of the ADA. The use of reflective material such as glass spheres or beads enhances low light detection of the detectible warnings and further decreases the amount of polymer. Finally, the percentage abrasive not only increase the potential coefficient of friction of the warnings, but also provide additional strength as an aggregate and decrease the overall amount of resin needed for a given application.

In order to create the afore-described detectible warnings on a surface, mask 30 having a plurality of perforations in the form of apertures 34 must first be created. In preferred form, mask 30 is a resilient planar member or mat having a plurality of apertures 34 arranged in a desired pattern. Each aperture 34 represents a mold for the desired protrusions. Thus, the material of the mat defining each aperture is in roughly complimentary relationship to the desired physical dimensions of the protrusion. Referring to FIGS. 1 and 2, the preferred dimensions of protrusions 16a are approximately the following: length: 1.5"; width: 0.8"; height: 0.14". The spacing between obtuse ends along the sinusoidal path is approximately 1" in FIG. 1 and 0.8" in FIG. 2. The path to path distance indicated by line B is approximately 3".

Figure 5:
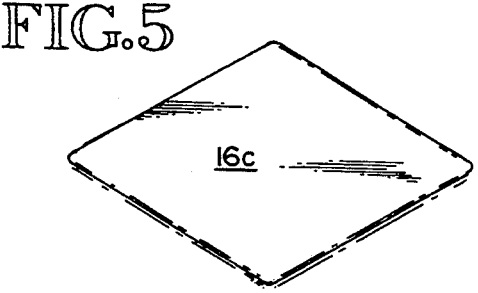
FIG. 5 shows a plan view of an alternative detectible warning in the form of a diamond design.
Figure 6:
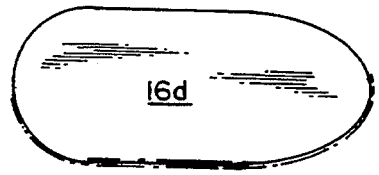
FIG. 6 shows a plan view of an alternative detectible warning in the form of an asymmetrical elongated elliptical design.
Figure 7:
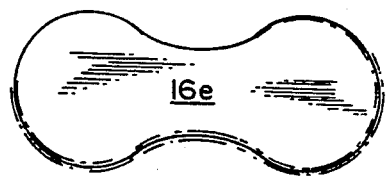
FIG. 7 shows a plan view of an alternative detectible warning in the form of a asymmetrical dumbbell design.
Figure 8:
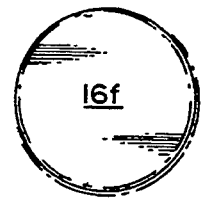
FIG. 8 shows a plan view of an alternative detectible warning in the form of a circular design.

As best shown in FIGS. 5 through 8, a sampling of various protrusions 16c-f are illustrated. FIG. 5 shows a diamond shaped design; FIG. 6 shows an asymmetrical elongated elliptical design; FIG. 7 shows a dumbbell design; FIG. 8 shows a circular design. Regardless of the form of protrusion, each protrusion is characterized as having an inclined peripheral surface and rounded or curved transitions between both the substrate and the upper surface.

Figure 4:
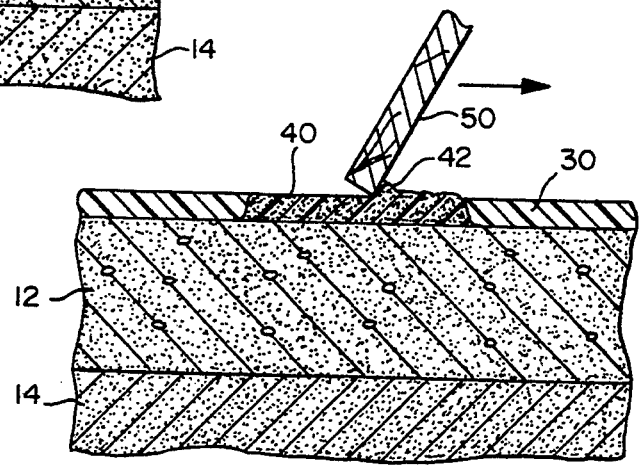
FIG. 4 is a cross sectional elevation of the detectible warning formation process including a mask and screed board for removing excess material.

As best shown in FIG. 4, perforated mat 30 is then located on the surface of substrate 12 with the larger area aperture facing towards substrate 30. A blend of methyl methacrylate monomers and adjuncts such as those described above are combined with a catalyst such as a peroxide to promote polymerization of the mixture, now referred to as blend 40. Soon after introducing the catalyst, blend 40 is worked into each aperture 34 so as to insure complete distribution therein and adequate exposure to the substrate surface. As shown in FIG. 4, excess blend 42 can be removed from mat 30 by screed board 50 or the like leaving a smooth upper surface 26 that is coplanar with upper surface 32 of mat 30. Blend 40 is allowed to partially polymerize after which mat 30 is removed from surface 12. Because of the resilient nature of mat 30, excess blend 40 can be removed therefrom by flexing mat 30 to cause the blend to flake off.

By removing mat 30 prior to complete polymerization of blend 40, protrusions 16 slump slightly, thus creating or enhancing the aforementioned transitions 22 and 24. Consequently, the final amount of transition curvature is controlled by the line at which mat 30 is removed. It has been found that by removing mat 30 approximately 10–40 seconds after application of blend 40 as previously described, the optimal transition curve is produced. After permitting a sufficient cure time, the detectible warnings formed by the above-referenced process are ready for use.

As described previously, the present invention for producing detectible warnings is not limited to that application. By increasing the proportion of one or more of the adjuncts, variations of the product are possible. The following examples are intended to illustrate the possible different applications of the invention and are not intended as limitations thereof. For example, by increasing the proportion of abrasive, an antislip surface can be deposited on a surface; by increasing the proportion of reflective material, tactile warning markers having strong reflective properties can be created. Examples of such markers include roadway surface markers, vertical surface markers, bicycle path markers, and the like. If one were to increase the proportion of pigments, the resulting product would progressively lose its translucent properties and increase its distinction over surrounding materials.

Industrial Applicability

The present invention will find utility in material deposition processes for creating protrusions on surfaces and more specifically for providing detectible warnings on traveled surfaces. Industries that would utilize or benefit from such processes include construction trades, roadway construction and improvement trades, and architect trades.

What is claimed is:

1. A method for producing in situ a pattern of detectable warnings on a surface comprising the steps of:
   a) perforating a sheet of non-porous material having an upper and lower surface to form a mask having a plurality of apertures in the form of a repeating pattern wherein the sheet has a thickness corresponding to the desired elevation of the detectable warnings;
   b) positioning the mask on a substrate surface so that the lower surface thereof contacts the substrate;
   c) preparing a viscous substance having the ability to cure into a solid;
   d) initiating a cure of the viscous substance;
   e) filling the apertures with the viscous substance;
   f) removing the mask thereby exposing raised detectable warnings on the substrate; and
   g) permitting the detectable warnings to cure substantially completely and undisturbed.

2. The method of claim 1 wherein the step of preparing the viscous substance further comprises the step of combining at least one adjunct to create a viscous blend.

3. The method of claim 2 wherein the at least one adjunct comprises glass fibers, glass spheres, glass filaments, pigments, or abrasives.

4. The method of claim 1 wherein the vicous substance is a two part polymer.

5. The method of claim 1 wherein the viscous substance is selected from the group consisting of polyester, polyethylene, polyurethane, polypropylene, polymethacrylate, polystyrene, polystyrene-acrylonitrile, polyvinylchloride, vinylchloride acetate, nylon, rayon, acetate, acetate butyrate, rubber, and polycarbonate.

6. The method of claim 5 wherein the step of preparing the viscous substance further comprises the step of combining at least one adjunct to create a viscous blend.

7. The method of claim 6 wherein the at least one adjunct comprises glass fibers, glass spheres, glass filaments, pigments, or abrasives.

8. The method of claim 1 wherein the apertures have an inclined peripheral surface that converges towards the upper surface of the mask.

9. The method of claim 1 wherein the apertures resemble elongated ellipses.

10. The method of claim 9 wherein the apertures have an inclined peripheral surface that converges towards the upper surface of the mask.

11. The method of claim 1 wherein the apertures are located end to end so as to form a sinusoidal pattern, each pattern being in stacked relationship to another similar pattern.

12. The method of claim 11 wherein the apertures resemble elongated ellipses.

13. The method of claim 11 wherein the apertures have an inclined peripheral surface that converges towards the upper surface of the mask.

14. The method of claim 11 wherein each detectable warning has a length of approximately 1.5", a width of approximately 0.8", and a heigth of approximately 0.14".

15. The method of claim 1 wherein the mask is removed at a time such that each detectalbe warning slumps thereafter so as to create curved transition areas between the substrate surface and the peripheral surface, and between the peripheral surface and the upper surface of the detectable warning.

16. The product resulting from the method of claim 1.

17. The product resulting from the method of claim 4.

18. The product resulting from the method of claim 15.

19. A method for producing in situ a pattern of detectable warnings on a surface comprising the steps of:
   a) perforating a sheet of non-porous material having an upper and lower surface to form a mask having a plurality of apertures in the form of a repeating pattern wherein the sheet has a thickness corresponding to the desired elevation of the detectable warnings and wherein the peripheral surface of each aperture is inclined towards the upper surface of the mask:
   b) positioning the mask on a substrate surface so that the lower surface thereof contacts the substrate;
   c) preparing a viscous blend having the ability to cure into a solid wherein the blend has at least one adjunct comprising a reinforcing component, a reflective component, a pigment, or an abrasive;
   d) initiating a cure of the viscous blend;
   e) filling the apertures with the viscous blend;
   f) removing the mask thereby exposing raised detectable warnings on the substrate at a time in which the blend slumps to thereby create curved transition areas between the substrate surface and the peripheral surface, and between the peripheral surface and the upper surface of each detectable warning; and
   g) permitting the detectable warnings to cure substantially completely and undisturbed.

* * * * *

REEXAMINATION CERTIFICATE (3710th)

United States Patent [19]

Julnes

[11] B1 5,385,770

[45] Certificate Issued Jan. 19, 1999

[54] METHOD FOR PRODUCING DETECTIBLE WARNINGS ON SURFACES AND PRODUCTS THEREOF

[76] Inventor: Jon N. Julnes, P.O. Box 1870, Woodinville, Wash. 98072

Reexamination Request:
No. 90/004,033, Nov. 17, 1995

Reexamination Certificate for:
Patent No.: 5,385,770
Issued: Jan. 31, 1995
Appl. No.: 243,952
Filed: May 17, 1994

[51] Int. Cl.$^6$ .............................. B05D 1/32; B05D 5/10; B32B 3/00
[52] U.S. Cl. ...................... 428/195; 427/137; 427/272; 427/282; 428/206; 428/210; 428/325
[58] Field of Search ................................. 427/137, 272, 427/282; 428/195, 206, 210, 325

[56] References Cited

U.S. PATENT DOCUMENTS

| | | | |
|---|---|---|---|
| 1,947,271 | 2/1934 | Mattison | 427/272 |
| 4,758,469 | 7/1988 | Lange | 427/137 X |
| 4,988,555 | 1/1991 | Hedblom | 427/137 X |
| 5,203,881 | 4/1993 | Wiand | 51/293 |

OTHER PUBLICATIONS

*Product Brochure, Dura–Stripe® Road Marking system,* Morton International (1992).
*Product Bulletin, Two–Component Highway Marking System: Dura–Stripe®,* Morton International (16 Feb. 1993).
*Photographs of "Pathfinder" tile Manufactured by the Carsonite Company,* Carson City, Nev, no date.
*Pavement Tool Manufacturers, Inc. 1993 Catalogue* (published Jan. 1993).

*Primary Examiner*—Michael R. Lusignan

[57] ABSTRACT

The present invention is characterized as methods for fixedly depositing solidified protrusions on to a surface, and products thereof so as to create a detectible warning whereby the tactile and visual characteristics of the detectible warnings contrast with the tactile and visual characteristics of surrounding surfaces. To create such a detectible warning, a mask in the form of a resilient mat perforated with a plurality of apertures so as to form a repeating pattern. Each aperture acts as a mold of a protrusion having predetermined dimensions. To enhance the funcitonality of the protrusions, each pro- trusion has a generally inclined peripheral surface and rounded peripheral surface to substrate and peripheral surface to upper surface interfaces. The mat is placed in contact with the substrate on which a detectible warn- ing is desired. A blend is created from a curable viscous substance and one or more of the following: reinforcing elements, reflective elements, pigments, or abrasives. The blend is then worked into the apertures whereupon it begins to solidify. After the blend becomes semi-sta- ble, the mat is removed and the protrusions are allowed to fully cure.

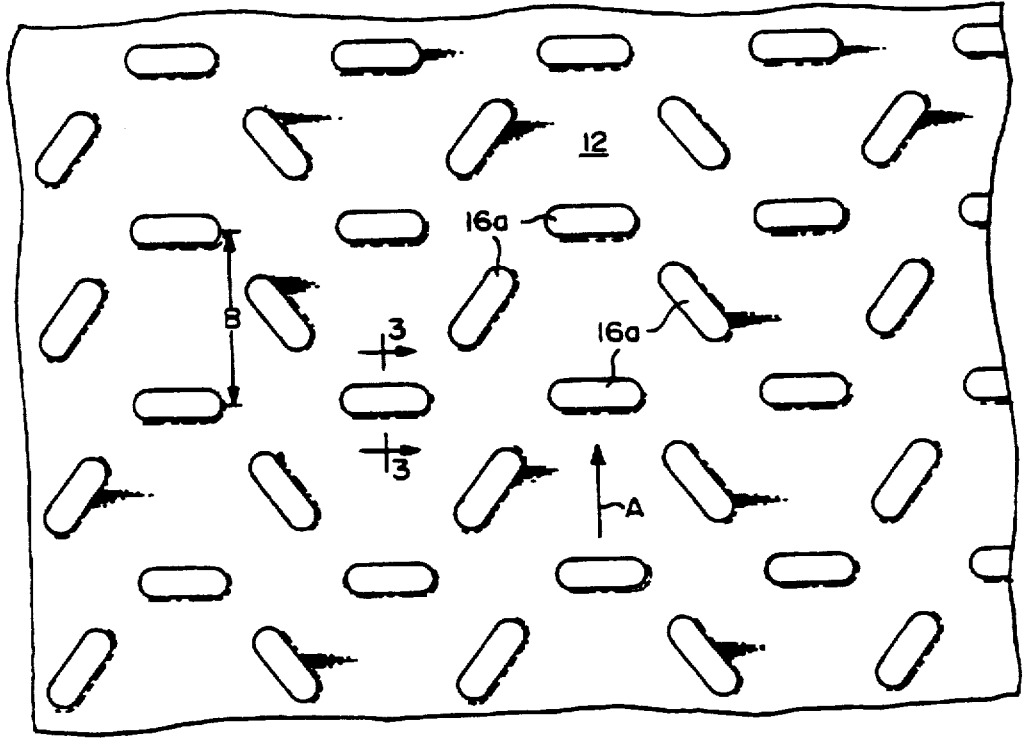

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 19 is confirmed.

Claims 15 and 18 are cancelled.

Claim 1 is determined to be patentable as amended.

Claims 2–14, 16 and 17, dependent on an amended claim, are determined to be patentable.

1. A method for producing in situ a pattern of detectable warnings on a surface comprising the steps of:

(a) perforating a sheet of non-porous material having an upper and lower surface to form a mask having a plurality of apertures in the form of a repeating pattern wherein the sheet has a thickness corresponding to the desired elevation of the detectable warnings;

(b) positioning the mask on a substrate surface so that the lower surface thereof contacts the substrate;

(c) preparing a viscous substance having the ability to cure into a solid;

(d) initiating a cure of the viscous substance;

(e) filling the apertures with the viscous substance;

(f) removing the mask thereby exposing raised detectable warnings on the substrate, *the mask being removed at a time prior to complete cure of the viscous substance such that each detectable warning slumps thereafter so as to create curved transition areas between the substrate surface and the peripheral surface and between the peripheral surface and the upper surface of the detectable warning;* and (g) permitting the *detectable* warnings to cure substantially completely and undisturbed.

* * * * *